(No Model.)

W. H. DRAYTON.
FAN ATTACHMENT FOR SEWING MACHINES.

No. 578,509. Patented Mar. 9, 1897.

Witnesses
B. C. Frazee
W. R. Edelen.

Inventor.
W. H. Drayton
By Glascock & Leo,
Attys.

UNITED STATES PATENT OFFICE.

WILLIAM HENRY DRAYTON, OF WASHINGTON, DISTRICT OF COLUMBIA.

FAN ATTACHMENT FOR SEWING-MACHINES.

SPECIFICATION forming part of Letters Patent No. 578,509, dated March 9, 1897.

Application filed April 9, 1896. Serial No. 586,766. (No model.)

*To all whom it may concern:*

Be it known that I, WILLIAM HENRY DRAYTON, a citizen of the United States, residing at Washington, in the District of Columbia, have invented a certain new, useful, and valuable Improvement in Fan Attachments for Sewing-Machines, of which the following is a full, clear, and exact description.

My invention has relation to fan attachments for sewing-machines; and it consists in the novel construction and arrangement of its parts, as hereinafter described.

Figure 1:
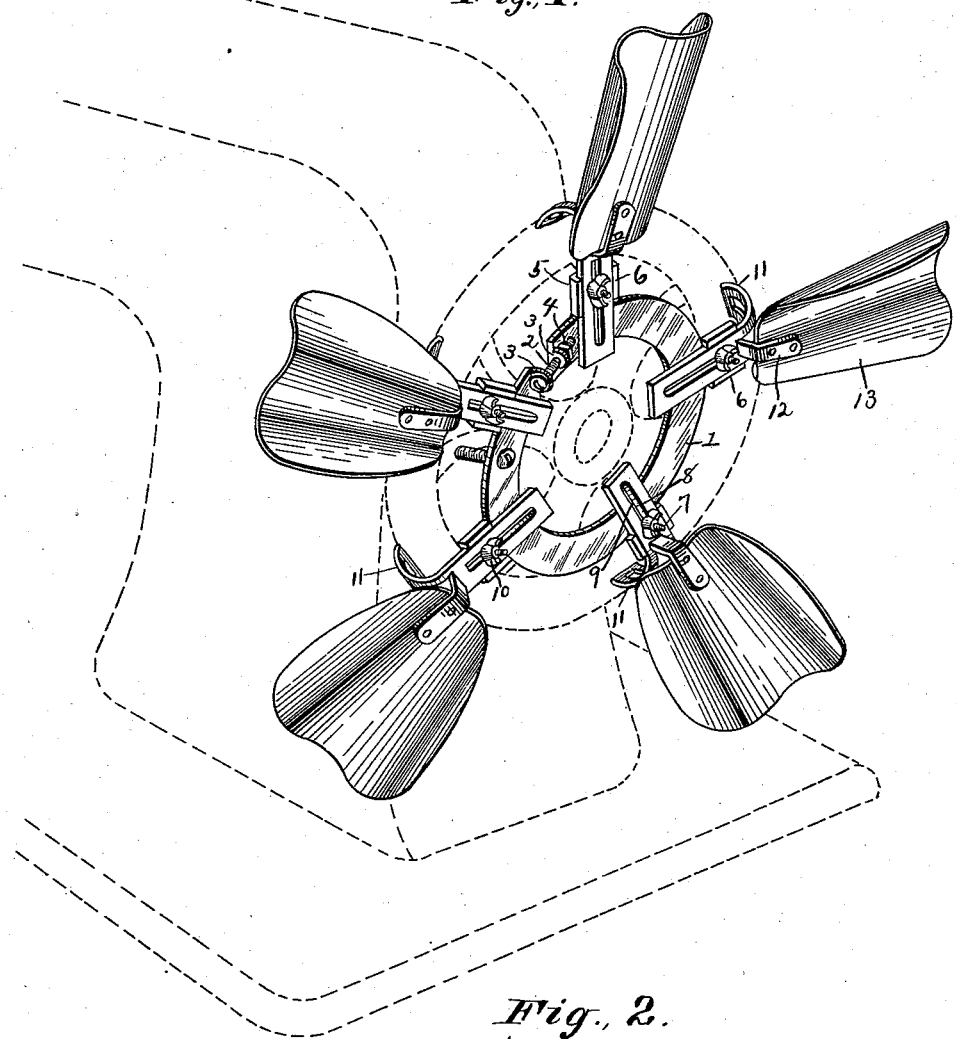
Figure 2:
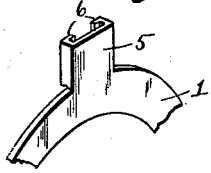

In the accompanying drawings, Figure 1 is a perspective view of the attachment. Fig. 2 is a detail perspective view of part of the attachment.

The attachment consists of the central portion 1. Said portion is annular in shape. The portion 1 is provided with a means for contracting and expanding the same, said means consisting of the screw 2, which passes through the perforations in the lugs 3 3, the threaded end of the screw engaging the nut 4. By revolving the screw 2 the portion 1 may be contracted or expanded. At intervals around its periphery the portion 1 is provided with the radial extensions 5, said extensions having along their edges the flanges 6 6. Each extension is provided with a threaded bolt 7. The extensions 5 and their flanges are adapted to receive the shanks 8. Each said shank is provided with an elongated perforation 9, which receives the threaded bolt 7. The thumb-nut 10 retains the shank 8 in its proper position on the extension 5.

The outer ends of the shanks 8 are formed in the shape of a hook, as at 11. Said hooks are adapted to grip the periphery of the fly-wheel of the sewing-machine when the attachment is applied thereto.

A tongue 12 is cut in the hooked end of each shank 8. Said tongue is bent out and extends in the opposite direction from that in which the hook extends. A fan or blade 13 is attached to each tongue 12. The blades 13 may be bent in any desired shape, and they may be pitched at any desired angle by twisting the tongues 12.

By shifting the shanks 8 in or out the attachment may be made to fit any sized wheel. After the attachment is applied to the wheel it is securely tightened in position by contracting the portion 1. As an additional feature to prevent the attachment slipping around the periphery of the fly-wheel the portion 1 is provided with the protrusion 14, which extends in and engages one of the spokes of the fly-wheel.

The attachment may be made of any desired material; but I believe that it is preferable to make it of aluminium. The arrangement of the parts and the minor details of construction may be varied or altered without departing from the spirit of my invention.

Having described my invention, what I claim as new, and desire to secure by Letters Patent, is—

1. A fan attachment consisting of a central portion, hooks extending radially from said portion and adjustably secured to said portion, fans mounted on said adjustable hooks.

2. A fan attachment consisting of a central portion, hooks extending radially from said portion, and adjustably secured to said portion.

3. A fan attachment consisting of a central portion, said portion having radial extensions, blades adjustably secured to said extensions beyond the periphery of the central portion.

4. A fan attachment consisting of a central portion, said portion having radial extensions, said extensions having along their edges flanges, blades adjustably secured to said extensions.

5. A fan attachment consisting of a central portion, said portion having extensions, threaded bolts attached to said extensions, radially-extending shanks having elongated perforations, said perforations receiving the said bolts, blades mounted on said shanks.

6. A fan attachment consisting of a central portion, threaded bolts attached to said portion, radially-extending shanks having elongated perforations, said perforations receiving the said bolts, hooks fashioned at the ends of the shanks.

7. A fan attachment consisting of a central portion, threaded bolts attached to said portion, radially-extending shanks having elongated perforations, said perforations receiving the said bolts, hooks fashioned at the ends of the shanks, tongues attached to the shanks, blades mounted on said tongues.

In testimony whereof I affix my signature in presence of two witnesses.

WILLIAM HENRY DRAYTON.

Witnesses:
A. E. GLASCOCK,
F. H. GOODALL.